United States Patent [19]

McLaren et al.

[11] Patent Number: 5,011,098
[45] Date of Patent: Apr. 30, 1991

[54] THERMAL ANTI-ICING SYSTEM FOR AIRCRAFT

[75] Inventors: Douglas McLaren, Seattle; William W. Orr, Mercer Island, both of Wash.

[73] Assignee: The Boeing Company, Seattle, Wash.

[21] Appl. No.: 292,541

[22] Filed: Dec. 30, 1988

[51] Int. Cl.⁵ .............................................. B64D 15/04
[52] U.S. Cl. .............................. 244/134 B; 60/39.093
[58] Field of Search ........... 246/117 A, 134 R, 134 B, 246/133; 60/39.093

[56] References Cited

U.S. PATENT DOCUMENTS

| | | | |
|---|---|---|---|
| 2,447,095 | 8/1948 | Schmidt | 244/134 B |
| 2,470,128 | 5/1949 | Barrick et al. | |
| 2,478,878 | 8/1949 | Smith et al. | |
| 2,556,736 | 6/1951 | Palmatier | 244/134 B |
| 2,581,760 | 1/1952 | Harpoothian et al. | |
| 2,638,170 | 5/1953 | Prewitt | |
| 2,690,002 | 9/1954 | Grenell | |
| 2,723,092 | 11/1955 | Paselk et al. | |
| 3,023,860 | 3/1962 | Ellzey | |

FOREIGN PATENT DOCUMENTS

| | | | |
|---|---|---|---|
| 97141 | 10/1939 | Sweden | 244/134 B |
| 395864 | 12/1947 | United Kingdom | 244/134 B |

OTHER PUBLICATIONS

Aviation Week, vol. 58, issue 2, Jan. 12, 1953, pp. 20–21.
Flight, vol. 65, No. 2369, Jun. 18, 1954, p. 798.
Superplastic Forming/Diffusion Bonding, Rockwell International Brochure, 8-1978.
Neel, "Ap. Procedure for the Design of Air–Heated Ice–Prevention Sys.", NASA Tech. Note 3130, Jun. 1954.
Ti-Form Process Aluminum Alloys, Design Guide, copyright 1984, Texas Instruments Incorporated.
Controlled-Disbond Cladding Adds New Dimension to Metalworking, Edson, Daniel V., *Design News*, Jun. 16, 1986.
Texas Instruments Ti-Form Process, brochure MMPB001, 8/86, copyright 1986, Texas Instruments Incorporated.

*Primary Examiner*—Galen Barefoot
*Attorney, Agent, or Firm*—Hughes & Multer

[57] ABSTRACT

Thermal anti-icing systems for aircraft and methods for fabricating such systems. The anti-icing systems have an integrated one-piece skin with passageways formed therein to supply a heated fluid to that portion of an aircraft structure where anti-icing is desired. The anti-icing system also has an integrated or separately supplied manifold for routing heating fluid to the anti-icing system flow passages. The anti-icing system can be used in the leading edges of such aircraft structures as wings, horizontal and vertical stabilizers, inboard and outboard slats, engine struts, and engine cowls. A method for fabricating of aircraft structures with integral anti-icing systems of the character just described is also disclosed.

12 Claims, 10 Drawing Sheets

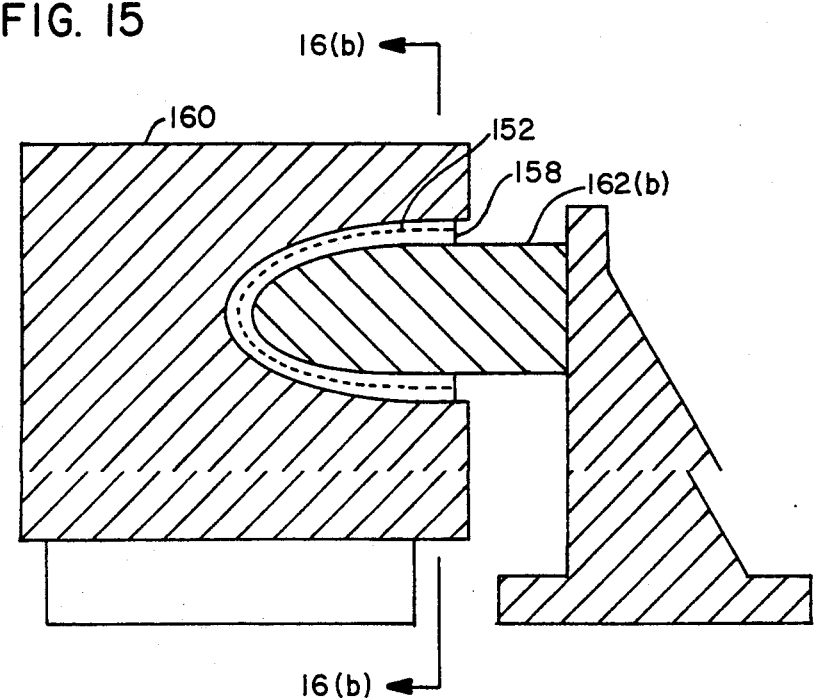
FIG. 15
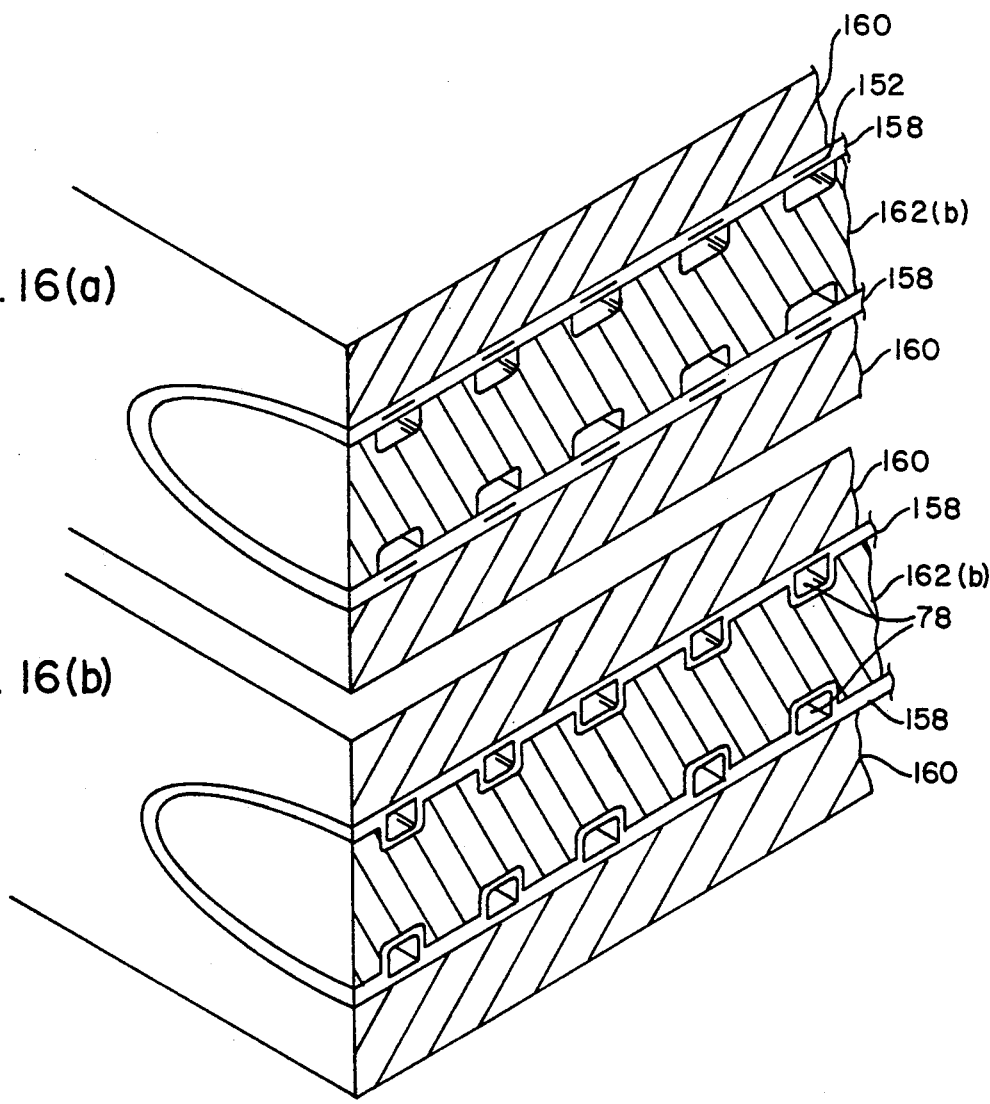
FIG. 16(a)
FIG. 16(b)

THERMAL ANTI-ICING SYSTEM FOR AIRCRAFT

TECHNICAL FIELD OF THE INVENTION

This invention relates to novel, improved anti-icing systems for aircraft and to methods for fabricating such systems.

BACKGROUND OF THE INVENTION

Anti-icing systems are widely used for the prevention of ice buildup on leading edges of aircraft structures. Components such as wings, leading edge slats and spoilers, engine inlets, engine struts, radar domes, and vertical and horizontal stabilizers are fitted with anti-icing equipment and systems as appropriate for the particular aircraft.

Known thermal anti-icing systems typically include a complex variety of installation details, including hot air distribution tubes, pipes, and plates, brackets, stiffeners, fasteners, welds, or adhesive bonds. These details increase engineering and manufacturing costs, and also increase the operating and maintenance costs for aircraft. Also, the extra weight of such complex structures imposes a performance penalty, i.e., increases aircraft fuel consumption. Further, the complex configuration leads to inefficient pressure losses in air supply lines and ducts. Also, in many configurations, the warmest air does not reach areas required to be heated without excessive mixing and cooling, thus reducing efficiency A number of de-icing systems have been identified. These are described in the patent literature as follows:

U.S. Pat. No. 2,447,095 issued to Schmidt on Aug. 17, 1948, discloses an airplane anti-icing system having an interior air distribution plenum (or, alternatively, hot air "spray tubes") and a perforated air distribution plate to evenly direct hot de-icing air from the plenum toward the interior surface of aircraft leading edge surfaces.

U.S. Pat. No. 2,470,128 issued to Barrick on May 17, 1949, discloses a leading edge construction technique which superficially resembles the novel anti-icing apparatus disclosed herein to a limited extent. The patented technique utilizes multiple corrugated sections, including a nose portion and an interior box beam portion, with communicating passageways between the sections, as illustrated for example in FIG. 2 of Barrick. The corrugated members are preformed. Techniques for securing the skin member to the corrugated member are not disclosed.

U.S. Pat. No. 2,478,878 issued to Smith et al. on Aug. 19, 1949, discloses a thermal anti-icing structure for incorporation into the leading edge structures of airplane wings. The structure provides an undersheet beneath the skin, with fasteners configured to provide a space between the undersheet and the skin. Also, a plurality of strips are provided for fitting between the undersheet and the skin, so as to define warming spaces for reception of heating air. It can be seen that the structure of Smith's invention requires many parts, thus necessitating extensive engineering and manufacturing labor.

U.S. Pat. No. 2,556,736, issued to Palmatier on June 12, 1951, discloses a de-icing system for rotor blades of helicopters and similar structures. The structure utilizes a spaced air flow passageway configuration which is positioned by a multitude of fasteners and support brackets, as may be seen in FIG. 2, FIG. 3, or FIG. 5 of Palmatier. Conventional bracket and fastener construction is utilized, thus increasing the complexity, cost, and weight of the Palmatier design when compared to the present invention.

U.S. Pat. No. 2,581,760, issued to Harpoothian et al. on Jan. 8, 1952, shows a stressed skin thermal de-icing design. The design includes inner and outer skins, with chordwise corrugations for directing hot air flow. The corrugated structure and the inner and outer skins are joined by rows of spaced fastening elements. This design thus contains the added weight of a multitude of fasteners and brackets. Also, the pressure losses and leaks inherent in such design result in reduced efficiency when compared to the present invention.

U.S. Pat. No. 2,638,170, issued to Prewitt on May 12, 1953, shows a de-icing design for a helicopter rotor or an aircraft propeller. The airfoil leading edge member has a hollow interior with a generally triangular shaped section, and the member is formed from a single integral tube by drawing. The rear of the leading edge member is perforated and adapted to supply warmed air. The warmed air heats the rotor for de-icing; and, as the air is cooled, it is swept toward the tip of the rotor where it is discharged.

U.S. Pat. No. 2,723,092, issued to Paselk et al. on Nov. 8, 1955, shows an anti-icing radome design. The structure provides anti-icing fluid passageways adjacent to the external walls, and utilizes laminated glass fiber construction.

U.S. Pat. No. 3,023,860, issued to Ellzey on Mar. 6, 1962, provides passageways for anti-icing air in the interior of an airfoil section The passageways are formed by a spiral winding construction technique Closed segments between passageways are welded such as by electrical spot welding.

As will be explained hereinafter, expansion of an appropriate sheet metal is a favored technique for producing important components of the novel de-icing systems disclosed herein. Various techniques are known for expanding materials into controlled shapes. One method is illustrated in U.S. Pat. No. 2,690,002 issued to Grenell on Sept. 28, 1954. Grenell shows how structural members requiring one flat surface, or heat exchangers requiring a plurality of interconnecting passages, may be constructed utilizing pressurized expansion. In Grenell, sheets are joined by sealing the edges of the sheets by welding, and by joining the faces of the sheets by spot welding. The joined sheets are then heated and hot rolled; and these steps are followed by cooling, cold rolling, and annealing. Grenell shows how heat exchange passages are created by hydraulic expansion, which may be controlled (i.e., by use of dies), or by free expansion where pressurization of the parts is adjusted to limit the amount of metal expansion.

Another method for forming passageways in expanded multi-layer metal parts is described in an article entitled "Controlled-Disbond Cladding Adds New Dimension To Metalworking," by Daniel V. Edson, appearing in Design News, June 16, 1986. The article describes a technique developed by Texas Instruments Incorporated for fabricating passageways between bonded metal sheets. The technique bonds sheets of metal together via roll bond cladding, and includes a step of printing a temperature sensitive ink between metal layers at those locations where it is desired to form passageways. Upon heating, the ink decomposes, generating a gas which provides pressure necessary to expand the portions of the metal sheets adjacent to the inked surfaces.

It is significant that none of the prior art patents identified above are concerned with the specific problems of metal fatigue or corrosion which are of paramount importance in, particularly, modern, large capacity, passenger aircraft, for example. Nor do they disclose devices which would inherently reduce stresses and metal fatigue so as to increase safe life of aircraft components or to reduce maintenance. Neither have prior art devices addressed anti-icing aircraft structures with a minimum of internal components and fasteners so as to reduce aircraft empty weight. Furthermore, the devices disclosed in many of the prior patents are considerably more complex than we consider desirable, especially from a manufacturing or maintenance standpoint.

SUMMARY OF THE INVENTION

As was pointed out above, the present invention relates to novel, improved anti-icing systems for aircraft and to methods for fabricating such systems. While the illustrated embodiments of the invention show anti-icing apparatus mounted in a generally horizontal configuration as if for use in a fixed or movable leading edge aircraft structure, such is not intended to limit the invention to the particular configuration or to limit its use to a specific location or shape. The anti-icing aircraft structure of the present invention is uniquely adapted to be utilized in a variety of locations, including some locations which have heretofore been difficult to arrange for de-icing, such as engine cowlings. However, the invention will be disclosed most extensively in its normal configuration for use in the anti-icing service most familiar to airmen, specifically airfoil leading edge surface de-icing.

By way of the present invention, we have developed a novel solution to the problem of manufacturing complexity, excess airframe weight, and susceptibility to corrosion and metal fatigue which are inherent in the heretofore disclosed thermal anti-icing systems of which we are aware. The apparatus of the present invention is free of such disadvantages due to elimination of complex fabrication techniques. Improved heat transfer characteristics are also provided. Such characteristics are of particular importance in newly developed, high speed, unducted fan turbine engines, which have propulsion blades which are completely exposed and unprotected against ice that might break away from upstream aircraft surfaces.

Our solution to providing a simple lightweight anti-icing device involves the use of heating fluid passageways and heating fluid distribution devices which are integrally formed with the aircraft leading edge structure. The anti-icing configuration thus provided and the various components therein are reduced in our design to the barest essential components, which can be assembled with a minimum of fasteners and adhesives. Concomitantly, excellent heat transfer performance is achieved.

In short, we have developed an aircraft structure design for leading edges and other-structures subject to formation of ice, which contain an anti-icing apparatus inherently formed as a part of the structure itself. The structure comprises a single skin having an outer surface which is exposed to the airflow. The single skin is comprised of inner skin portions and outer skin portions, which within much of the structure are rigidly bonded together by a metallurgical bond. At desired locations, passageways are formed within the leading edge structure between an outer skin portion ("outer skin"), and an inner skin portion ("inner skin"). The outer skin has an inner surface which cooperates with an outer surface of the inner skin to define a series of flow passages for a heat transfer fluid. The passageway defining segments of the outer surface of the inner skin are of complementary configuration to surface defining segments on the inner surface of the outer skin. These passageways are disposed in a side by side relationship, and extend from the leading edge of the structure toward the rear of the structure. Typically, heated fluid inlets are provided at the leading edge of the structure, with outlets to the rear of the inlets. In some cases, additional de-icing requirements may exist on the lower portion of the structure, and inlets for heating fluid may be provided somewhat to the rear of the leading edge of the structure to fulfill these requirements.

The structures de-iced in accord with the principles of the present invention typically include a bulkhead frame extending spanwise within the interior of the structure and extending up and down from one of the segments of the inner skin to the other segment of the inner skin. The frame has edge portions which are generally configured complementary to the inner surfaces of the inner skin segments and are seated thereon.

A heated fluid supply manifold is provided. The fluid supply manifold is generally supported from the forward side of the bulkhead frame, and it runs spanwise across a series of also provided fluid flow passageways. Heating fluid may be supplied to the supply manifold via various means. For example, in turbine powered aircraft, a compressed air supply line is typically provided to supply hot bleed air from the turbine engine compressor to the anti-icing device.

Once the heated fluid is introduced into the supply manifold, the fluid is distributed spanwise along the manifold, and is allowed to exit the manifold at intervals therealong through a plurality of apertures in the manifold. The heating fluid thereby slightly pressurizes a heating fluid supply plenum, and thereafter flows towards the inlets of the above-mentioned passageways. The heating fluid then flows into inlet portions and thereafter through the heating passageways. While in the passageways, the heating fluid transfers thermal energy to the outer skin of the aircraft structure, so as to heat the skin and thereby inhibit the formation of ice on the externally exposed surfaces of the skin. The heating fluid then exits the flow passageways. Generally, the heating fluid is then collected and dumped overboard through a plurality of exit passageways, typically provided on the lower surface of aircraft structures containing anti-icing devices therein.

OBJECTS, FEATURES, AND ADVANTAGES OF THE INVENTION

It is an object of the present invention to provide a thermal anti-icing device that eliminates the undue complexity and the undesired weight found in known devices.

It is also an object of the present invention to provide a thermal anti-icing device which is simple and therefore inexpensive to manufacture.

It is an important object of the present invention to provide an anti-icing system which maximizes heat transfer at critical supercooled water droplet impingement locations on aircraft structures.

It is an important feature of the present invention that engine compressor hot bleed air requirements for thermal anti-icing service are reduced when compared to conventional thermal anti-icing systems.

It is an important and primary feature of the present invention that the need for a multitude of fasteners is eliminated in thermal anti-icing aircraft structures along with the cost of installing such fasteners.

It is a feature of the present invention that aircraft structures incorporating thermal anti-icing systems employing its principles may be manufactured in modules for quick assembly to other aircraft structures.

It is an advantage of the present invention that the simple design of the anti-icing systems disclosed herein reduces engineering and manufacturing costs for the aircraft builder.

It is another advantage of the present invention that the elimination of fasteners provides a smooth skin surface which results in improved aerodynamic efficiency of airfoil surfaces.

A related and important advantage of the present invention is that our thermal anti-icing system design virtually eliminates the need for fastener penetrations in an aircraft structure, thus providing a structure which is resistant to mechanical fatigue cracking and thereby improves the useful life of the aircraft structures.

Another related and significant advantage of the present invention is that elimination of fastener penetrations in an aircraft structure virtually eliminates sites for corrosive materials to accumulate in the surface of the structure, thus dramatically reducing potential corrosion problems due to aircraft operations in salt air or polluted air environments.

It is yet another important advantage that reduced engine compressor hot bleed air requirements will minimize, in aircraft employing leading edge structures built according to the present invention, the normally encountered adverse effects of thermal anti-icing systems on aircraft engine performance.

It is yet a further advantage that the present design also reduces operation and maintenance costs for aircraft operators.

Additional objects, advantages, and novel features of the invention will be set forth in, or become apparent to, the reader from the appended claims, in the detailed description of the invention which follows, and the accompanying drawings.

BRIEF DESCRIPTION OF THE DRAWINGS

The invention may be more clearly understood by reference to the accompanying drawings thereof, wherein:

FIG. 15 is a cross sectional view of a die set which is utilized to shape a desired leading edge structure including anti-icing heat transfer passageways.

FIG. 16a and 16b illustrate before and after configurations of a leading edge structure in an expansion die where passageways are formed in accordance with the method of the present invention.

DETAILED DESCRIPTION OF THE INVENTION

Figure 1:
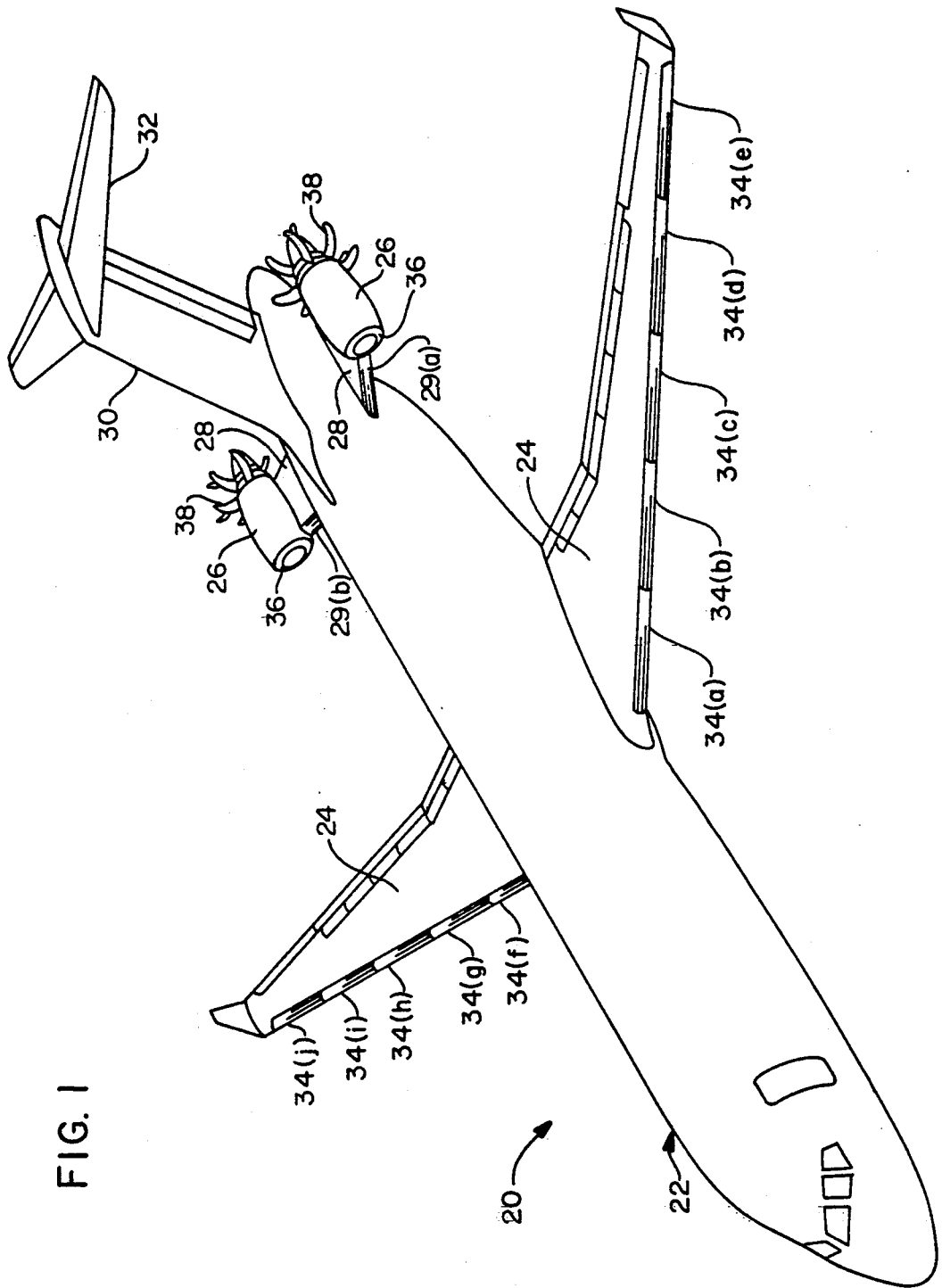
FIG. 1 is a perspective view of an aircraft illustrating typical locations where the anti-icing system of the present invention may be utilized.

Attention is now directed to FIG. 1. An aircraft 20 is illustrated having a fuselage 22, two wings 24, two engines 26 which are attached to fuselage 22 via struts 28, and a single "T" shaped appendage with a vertical stabilizer 30 and a horizontal stabilizer 32. Of particular interest in the illustration of potential applications for the present invention are leading edge portions 34 of wings 24. Leading edge portions 34 are illustrated in a movable configuration including inboard and outboard leading edge slats. Alternatively the structure of the present invention could be provided as a fixed leading edge structure. Leading edge structures 34 can be manufactured to a suitable external and internal configuration by the method of the present invention so that the desired anti-icing system is an integral part thereof. Similarly, the leading edges 29(a) and 29(b) of engine struts 28 can be equipped with de-icing systems in accordance with the present invention and manufactured by the methods taught herein. Additionally, engine cowling 36, located at the inlet portion of engine 26, can be de-iced in accordance with the teachings of the present invention and with systems manufactured by the methods taught herein.

As illustrated herein, engine 26 contains unducted fan blades 38 which are in a vulnerable exposed position and could be adversely effected by ice chunks breaking away from aircraft structures. Therefore, the ability to provide a high efficiency anti-icing apparatus within the confines of relatively small structures such as engine cowling 36 is of particular importance, especially, as fuel efficiency objectives are leading aircraft manufacturers towards aircraft 20 with unducted fan turbine engines.

There are five movable leading edge structures 34 (34 a-e or 34 f-j) on each wing 24. These are the inboard and outboard leading edge slats. Anti-icing systems in accord with the principles of our invention allow the different structures 34(a) through 34(j) to be modually manufactured and assembled, which is advantageous because it reduces manufacturing and maintenance costs. Less apparent is the fact that the heating fluid may be supplied independently to various leading edge surfaces equipped with our novel de icing system in relationship to the amount of heating fluid that is available. In other words, all leading edge surfaces need not be supplied with heating fluid simultaneously. Instead, they can be heated at different times, for example sequentially. This is especially important where newer high efficiency engines 26 are utilized, since there is a minimum of engine compressor bleed air available for heating service, especially during low engine power descents into environments containing supercooled water droplets, as will commonly be the case during conditions most conducive to accumulation of ice on aircraft structures.

Figure 2:
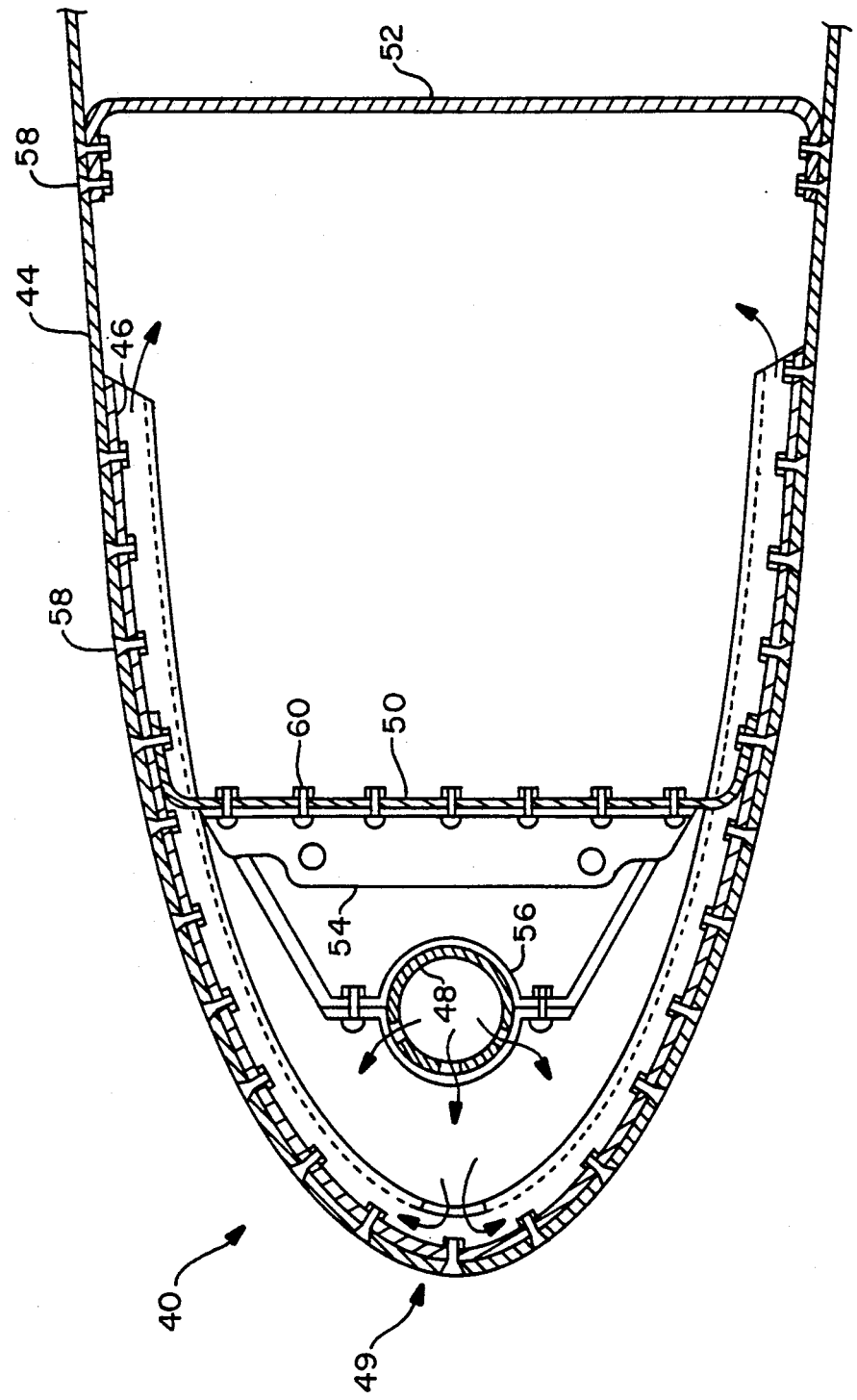
FIG. 2 is a vertical cross-sectional view taken chordwise through a wing of an aircraft showing a prior art anti-icing device.

In order that the reader may gain a greater understanding of the advantages provided by the present invention, a high efficiency airfoil with a prior art leading edge structure 40 anti icing device is illustrated in FIG. 2. As can be seen in FIG. 2, the primary components of leading edge structure 40 are an outer skin 44, an inner skin 46, and a longitudinally running, i.e. spanwise extending, heating fluid distribution tube 48 of the piccolo type. A forward bulkhead frame 50 extends generally vertically from the upper segment of the inner skin 46 to the lower segment of the inner skin 46 and forms a slightly pressurized plenum forward of bulkhead frame 50 for the heating fluid. Also, a rear vertically extending bulkhead frame 52 extends longitudinally spanwise through the structure 40 so as to form a return or discharge plenum between the bulkheads 50 and 52 and the upper and lower segments of inner skin 46. The heat transfer fluid is ultimately dumped overboard through an appropriate outlet (not illustrated). A bracket 54 and clamp 56 fixedly mount supply air distribution piccolo tube 48 from bulkhead frame 50. It can be clearly seen that a multitude of fasteners 58 are required to secure outer skin 44 to inner skin 46. Also, numerous fasteners 60 are required to secure bracket 54 to frame 50. Additional fasteners 58 are required to mount frame 52.

The overall effect of the manufacturing techniques utilized in such prior art devices is to require a large number of fasteners 58 which penetrate outer skin 44. Penetrations through skin 44 inevitably result in surface irregularities along the outer skin 44 where air flows past the leading edge structure 40. These irregularities reduce the smoothness of the outer skin 44, thus increasing drag on the leading edge structure 40. Surface irregularities also provide crevices where ice may initially begin to form. Additionally, penetrations of skin 44 result in stress points that focus and accelerate metal fatigue, thus decreasing the useful life of the leading edge structure 40. Penetrations of skin 44 at fasteners 58 also increase the susceptibility of leading edge structure 40 to corrosion, as for example, salt air and pollutants may reach the crevices present. Ultimately, additional maintenance and labor is required to replace or repair leading edge structure 40 so that weakened or cracked areas do not endanger the airworthiness of an aircraft.

Figure 3:
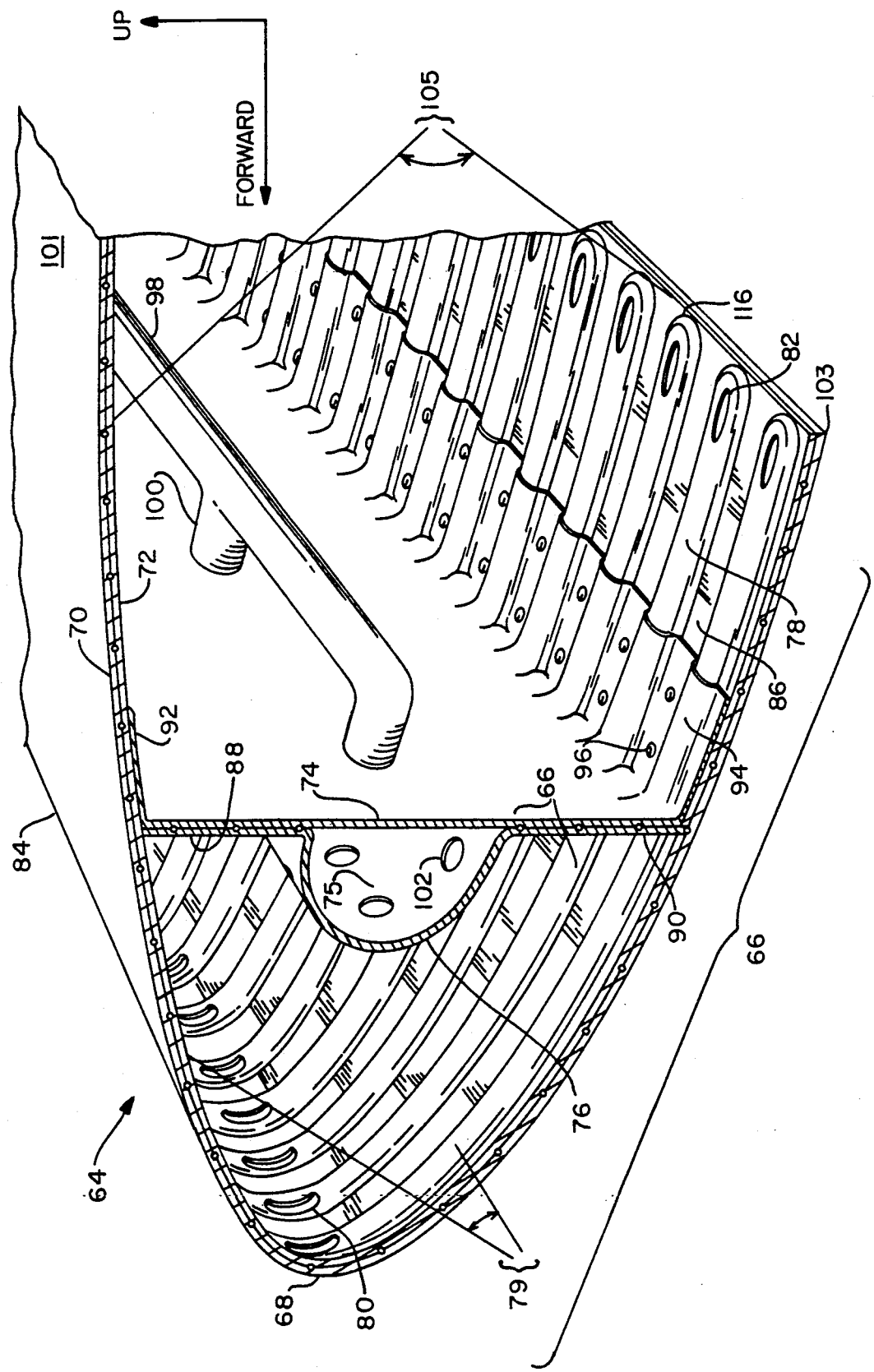
FIG. 3 is a perspective view of a section of a leading edge configured according to the present invention showing in detail chordwise running passageways for placing heating fluid in contact with an outer skin, and also showing a spanwise passageway for distribution of the heating fluid.

Turning now to FIG. 3, there is shown a novel, improved aircraft leading edge structure 64 embodying the principles of the present invention which includes an integrally formed system 66 for heating the structure to inhibit the formation of ice on its leading edge 68. Leading edge structure 64 is comprised of a single skin having an outer skin portion 70 and an inner skin portion 72; and anti-icing system 66 includes inner skin 72, a generally vertically disposed and spanwise extending bulkhead frame 74, and a longitudinally or spanwise extending heating fluid distribution duct or manifold 75 between bulkhead frame 74 and distribution duct forming member 76. Inner skin 72 has formed therein a series of side-by-side passageways 78 for a heat transfer (or heating) fluid. Passageways 78 are configured with inlet portions 80 and outlet portions 82. In the illustrated embodiment of the invention, inlet portions 80 are located inside and at the leading edge 68 of structure 64. Outlet portions 82 are located to the rear of inlet portions 80. Passageways 78 may be formed in both the lower segment and the upper segment of structure 64, as illustrated in FIG. 3. Alternatively, passageways may be disposed only on one of those portions, typically on the surface requiring the most anti-ice protection, as will later be illustrated.

As can be seen from FIG. 3, inner skin 72, when viewed in a spanwise direction, consists of alternating passageways 78 and generally flat segments 86. Flat segments 86 are rigidly bonded to the inner surface of outer skin 70 by a high pressure, cold roll, metallurgical bond. Thus, the present invention eliminates, or at least significantly reduces, those above-discussed problems appurtenant to the use of rivets to fasten high speed aircraft components together.

The horizontal, heating fluid distribution manifold 76 has an upwardly extending flange 88 and a downwardly extending flange 90. Flanges 88 and 90 are also bonded to bulkhead frame 74 by a high pressure, cold roll, metallurgical bond. This novel application of cold roll metallurgical bonding, discussed in some detail hereinbelow, eliminates the vast number of fasteners required in the prior art anti-icing device illustrated in FIG. 2. Also, the outer surface of skin 70 is smooth, since penetrations for fasteners are virtually eliminated.

For convenience of the reader, cold roll metallurigcal bonds are identified in the drawings with small "o" legends. Such bonds are used for instance, between adjacent inner skins 72 and outer skins 70, and between bulkheads 74 and heated fluid distribution manifold flange 88.

In the embodiment of our invention illustrated in FIG. 3, bulkhead frame 74 has an upwardly extending edge portion 92 and a downwardly extending edge portion 94 respectively seated on the upper and lower segments of inner skin 72. They consequently form a seal along a spanwise portion of inner skin 72 including both flat segments 86 and passageways 78. Bulkhead frame edge portions 92 and 94 keep heated fluid supplied to system 66 to de-ice leading edge structure 64 from leaking from the plenum 79 forward of bulkhead 74 to the space behind bulkhead 74. Thus, heating fluid must travel into de-icing system inlet portions 80 and thereafter through passageways 78 to outlet portions 82.

Fasteners 96 may be used to attach edge portions 92 and 94 of frame 74 to a desired edge structure 64. Frame 74 may alternately be rigidly affixed between upper and lower segments of the inner skin by an adhesive or other bonding technique, thus eliminating fasteners 96 and the corrosion and stress problems they may pose.

Heated fluid is supplied to leading edge structure 64 through de-icing supply lines 98. After traveling through supply lines 98 and then through inlet lines 100, the de-icing fluid travels through bulkhead frame 74 and into distribution duct or plenum 76 of anti-icing system 66. Distributed longitudinally along duct 76 are a series of heating fluid outlet apertures 102. After exiting through apertures 102, the de-icing fluid flows into the plenum 79 formed forward of bulkhead 74 and between the upper and lower segments of the leading edge 68 of structure 64. This fluid supply plenum or manifold of anti-icing system 66 is sometimes called a "D-duct," due to the reverse "D" shape formed by outer skin 70 and bulkhead frame 74. The ends of plenum 79 are defined by inboard and outboard end panels (not shown). Heating fluid exits the plenum 79 and enters inlet portions 80 of passageways 78 Thereafter, the heating fluid travels upwardly through the upper segment 101 of structure 64 and downwardly through the lower segment 103 and generally rearwardly toward outlet portions 82 of passageways 78. After exiting through outlet portions 82, the now cooled heating fluid is collected in a return heating fluid plenum 105 and either recycled for reheating or dumped overboard.

Typical anti-icing systems utilize engine compressor bleed air for de-icing. However, the present invention is not limited thereto and the heating fluid may be supplied from any convenient source. In any event, normal design conditions typically require fluid at a pressure of approximately 22.5 psig and a temperature of 380° F. with sufficient mass flow rate to keep exterior skin surfaces near the supply temperature.

Referring now to FIGS. 4 through 11, in many cases the components of the novel de-icing systems illustrated in those figures and embodying the principles of our invention are essentially duplicates of those shown in FIG. 3. To the extent that this is true, like reference characters have been employed for like purposes.

Figure 4:
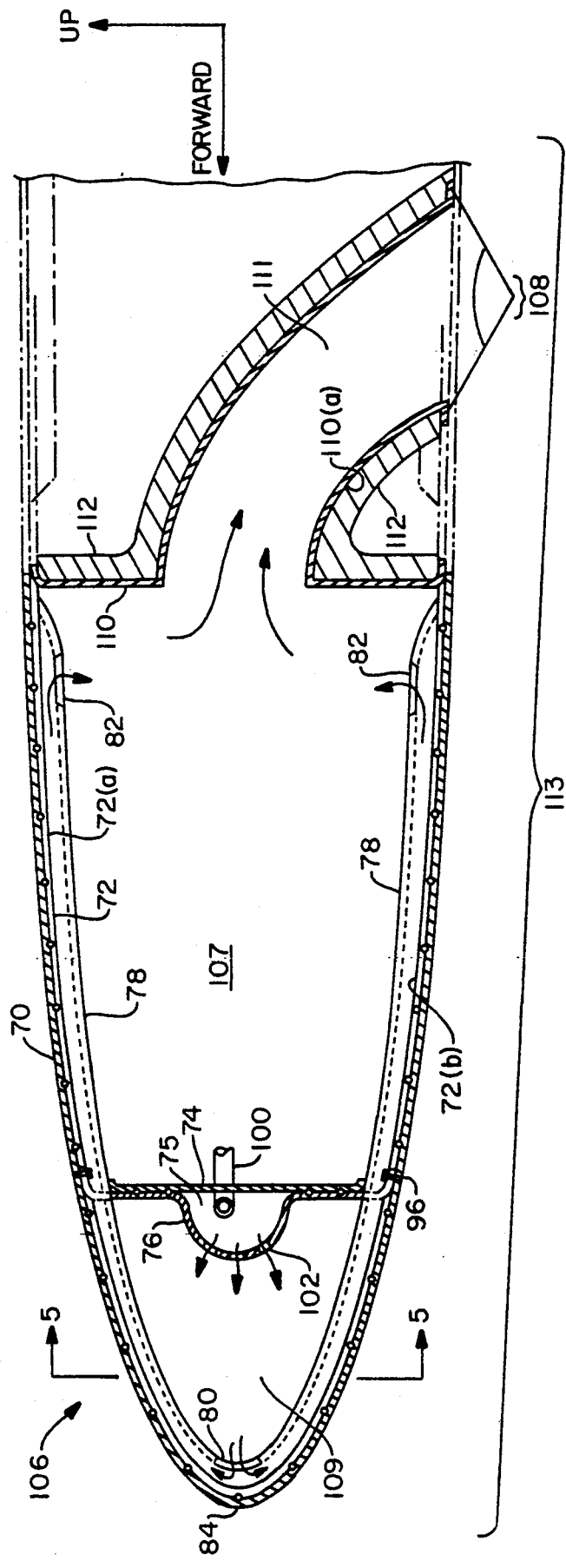
FIG. 4 is a vertical cross-sectional view taken chordwise through an aircraft leading edge structure, illustrating the path of heating fluid in an anti-icing system according to the present invention.
Figure 5:
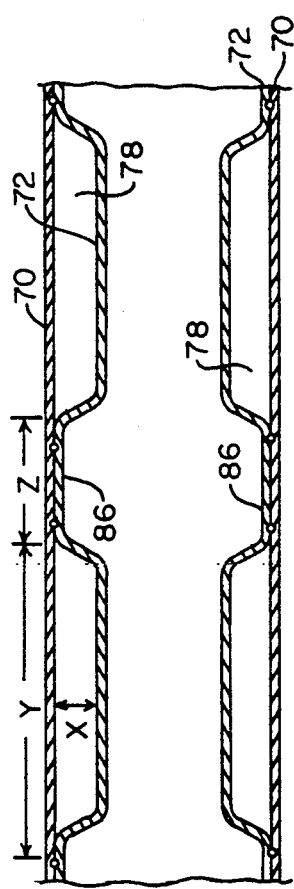
FIG. 5 is a vertical cross-sectional view taken through section 5—5 of FIG. 4, illustrating the segmented heating fluid passageways of the present invention.

Attention is now directed to FIG. 4, which depicts an aircraft structure 106 with an anti-icing system 113 much like the system 66 illustrated in FIG. 3. However, system 113 also has an exhaust air collection plenum 107 and a heating fluid overboard dump 108.

Heating fluid which has been directed through supply line 100 and into the longitudinally extending distribution manifold 75 between frame 74 and distribution duct forming member 76 flows outward from the distribution manifold through apertures 102 into a forward air supply plenum 109. This plenum is formed between the upper and lower segments of inner skin 72 between leading edge 84 and bulkhead frame 74. From the air supply plenum 109 the heating fluid travels through inlet portions 80 of and into passageways 78 formed between interior surface of outer skin 70 and the outer surface of inner skin 72, as may be more clearly seen in FIG. 5. In airfoil leading edge anti-icing applications, a clearance "X" between the inner surface of outside skin 70 and the outer surface of inner skin 72 of 0.25" is employed to provide acceptable heat exchanger performance In such a configuration, a passageway 78 width "Y" of 1.75" and a flat bonded segment 86 width "Z" of 0.50" may be employed.

Referring again to FIG. 4, the heating fluid travels rearwardly from leading edge 84 through passageways 78 until reaching the outlet portions 82 of passageways 78. This spent heating fluid then exits through outlet portions 82 into the return fluid collection plenum 107 defined between the rear of bulkhead frame 74, the upper and lower segments 72(a) and 72(b) respectively of inner skin 72, and the rear wall or bulkhead 110 spanning the upper and lower inner skin 72 segments 72(a) and 72(b) of structure 106.

Rear wall 110 and a cooperating structural member 110(a) define an outlet passage 111 for the spent anti-icing fluid. Insulation 112 on passage forming components 110 and 110(a) minimizes the transfer of heat to aircraft structure 106 or to contents of such structures (such as fuel or hydraulic fluid lines) rearward of anti-icing system 113. The cooled heating fluid is routed through outlet passage 111 and then to an overboard dump location 108. Again, system 113 makes possible an aircraft leading edge structure with a smooth outer skin surface 70.

By using adhesive, epoxy, or resin bonding techniques, the fasteners 96 utilized to secure frame 74 can be eliminated, thus providing a completely smooth exterior surface on the leading edge member 106 which is advantageous for the reasons discussed above. Furthermore, such a leading edge member 106 will not require replacement of fasteners or repairs necessitated by metal fatigue or corrosion in skin 70 at the fastener locations. Thus, by eliminating fasteners 96 the maintenance requirements are significantly reduced over the life of structure 106.

Figure 6:
FIG. 6 is an alternative embodiment of the present invention, illustrated in a chordwise cross sectional view through a leading edge structure as may be found in movable components such as inboard or outboard slats.
Figure 6:
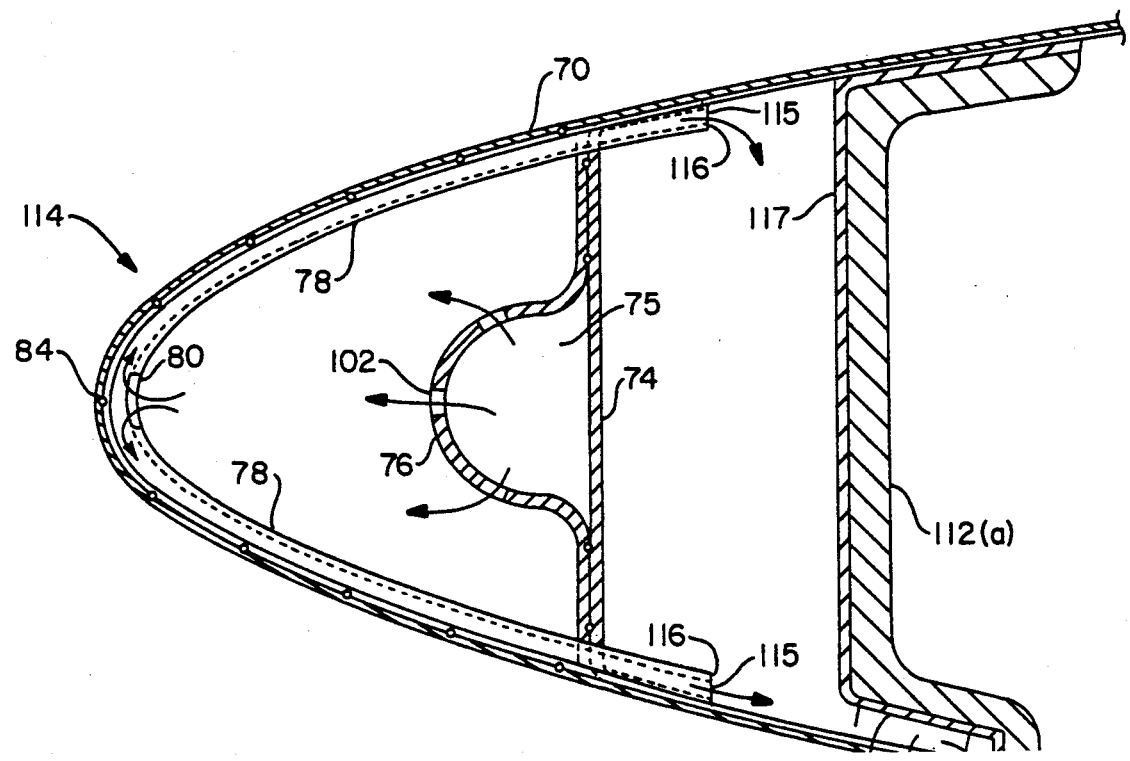

Turning now to FIG. 6, a further embodiment of our invention is illustrated. In that embodiment, leading edge structure 114 is provided with a heating fluid supply duct 76 and heating fluid passageways 78. Passageways 78, while having inlet portions 80 as previously discussed, have outlet portions 115 of a different configuration In particular, the rearward portion of each passageway 78 is configured so that the rearward portion of inner skin 72 uniformly ends in a generally vertical edge 116 extending spanwise across a section of structure 114. This configuration is advantageous in that eliminating restrictions to the flow of heating fluid minimizes the pressure loss at outlet portions 115.

Also illustrated in FIG. 6 is a rear return plenum bulkhead 117 which is rigidly secured within structure 114 without the use of fasteners At the lower portion of bulkhead 117 a rearwardly extending flange 118 cooperates with outer skin 70 to form a passageway 119 for directing cooled heating fluid toward an overboard dump port 120. Insulation 112(a) minimizes transfer of heat rearward from bulkhead 117.

The bulkhead frame 74 separating supply heating fluid from returned cool heating fluid need not necessarily be mounted vertically in any particular leading edge structure. In fact, where the leading edge structure is movable (see, for example, 34(a) through 34(j) in FIG. 1, above), the exact orientation of any particular bulkhead frame 74 or passageway 78 may vary to suit the requirements of a particular movable leading edge airfoil design.

Figure 7:
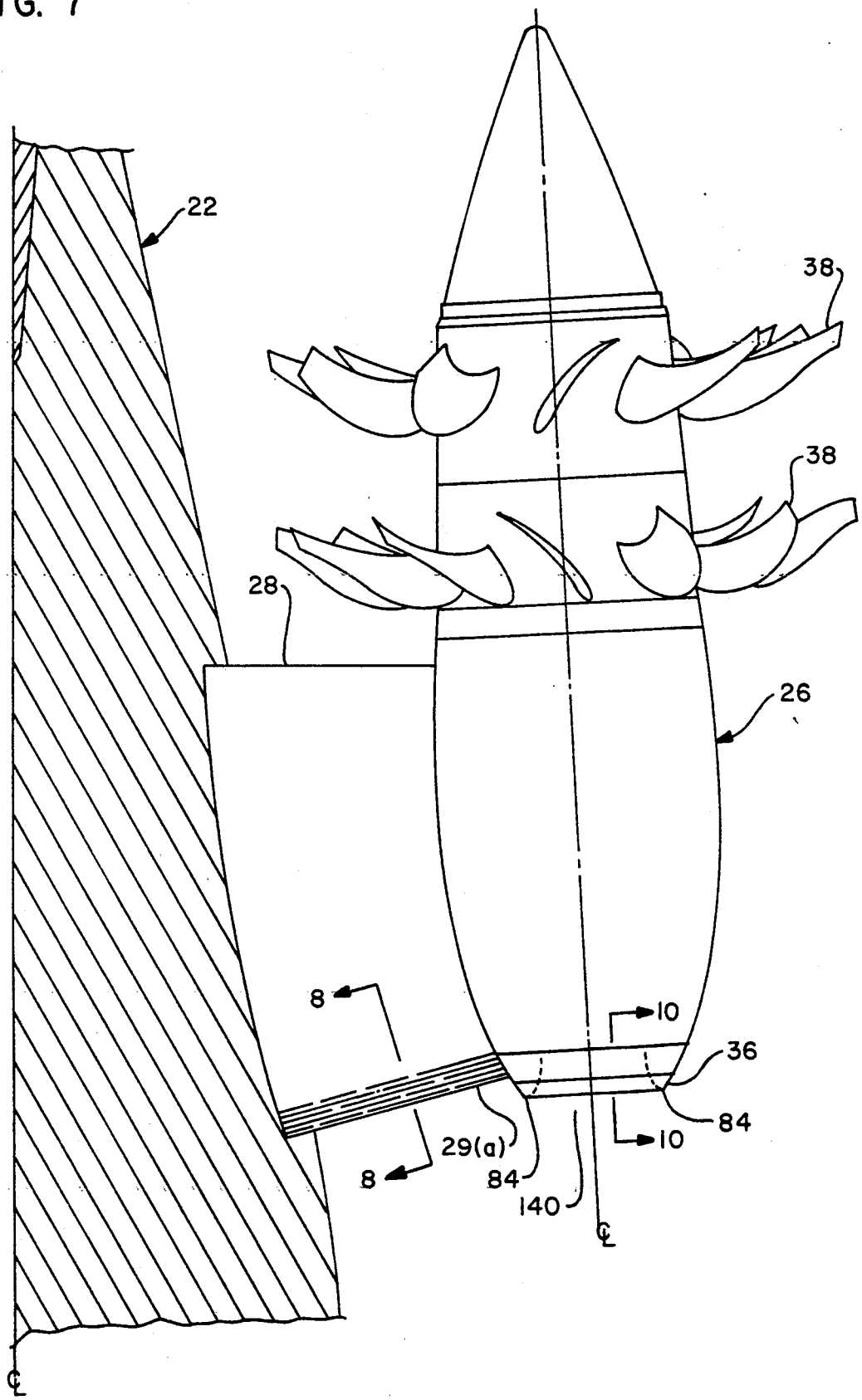
FIG. 7 is a top plan view of a rear quadrant of an aircraft, taken below the horizontal stabilizer; this view identifies still other locations for leading edge structures utilizing anti-icing systems according to the present invention.

Attention is now directed to FIG. 7, in which parts corresponding to those of FIG. 1 are indicated by corresponding reference character numerals. FIG. 7 generally shows a rear quadrant of the aircraft 20 of FIG. 1, with an engine 26 attached to fuselage 22 by engine strut 28. Strut 28 has a leading edge 29(a) equipped with an anti-icing system 121 of the character disclosed herein. Similarly, engine 26 has an inlet cowling 36 with an anti-icing system 123 according to the present invention.

Figure 8:
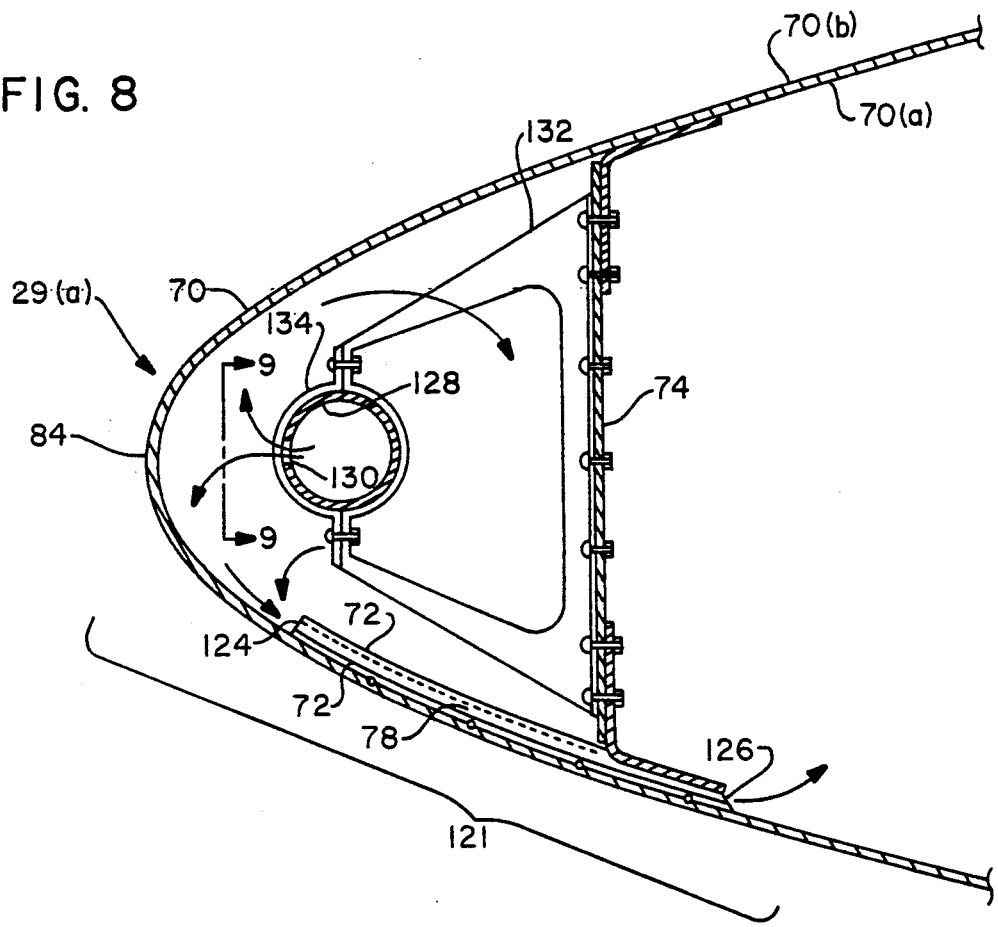
FIG. 8 is a vertical cross-sectional view of an embodiment of the present invention, taken through an engine support strut leading edge, along the line 8—8 of FIG. 7.

In FIG. 8, another embodiment of our invention is illustrated. Here, leading edge structure 29(a) is provided with heating fluid passageways 78 only on a small portion of the lower side of structure 29(a). Passageways 78 start well behind leading edge 84 of structure 29(a). In this configuration, both inlets 124 and outlets 126 of heating passageway 78 are shaped to provide a passageway 78 with minimum pressure drop due to inlet portions 124 and outlet portions 126. Such inlets and outlets, when viewed frontally, resemble those of the passageways 78 illustrated in FIG. 5.

In the embodiment of our invention illustrated in FIG. 8, heating fluid is transported spanwise of leading edge structure 29(a) via a piccolo tube fluid distribution device 128 having apertures 130 spaced therealong through which the heating fluid may escape. By thus spacing orifices 130 along the span of leading edge structure 29(a), the anti-icing fluid is allowed to flow from piccolo tube 128 through orifices or apertures 130, thence forwardly and downwardly into inlet portion 124 of heating fluid passageway 78. This eliminates cooling of the heating fluid by contact with the inner surface of the inner skin 72, or with the inner surface 70(a) of outer skin 70. Although the minimization of unwanted fluid cooling provided by piccolo tube 128 is particularly important in this and other configurations where a large portion of the inner surface 70(a) of outer skin 70 is not provided with passageways 78, the improved heat transfer efficiency of a device with a longitudinal heating fluid distributor such as tube 128 is inherent in all of the various embodiments of the present invention disclosed herein.

Figure 10:
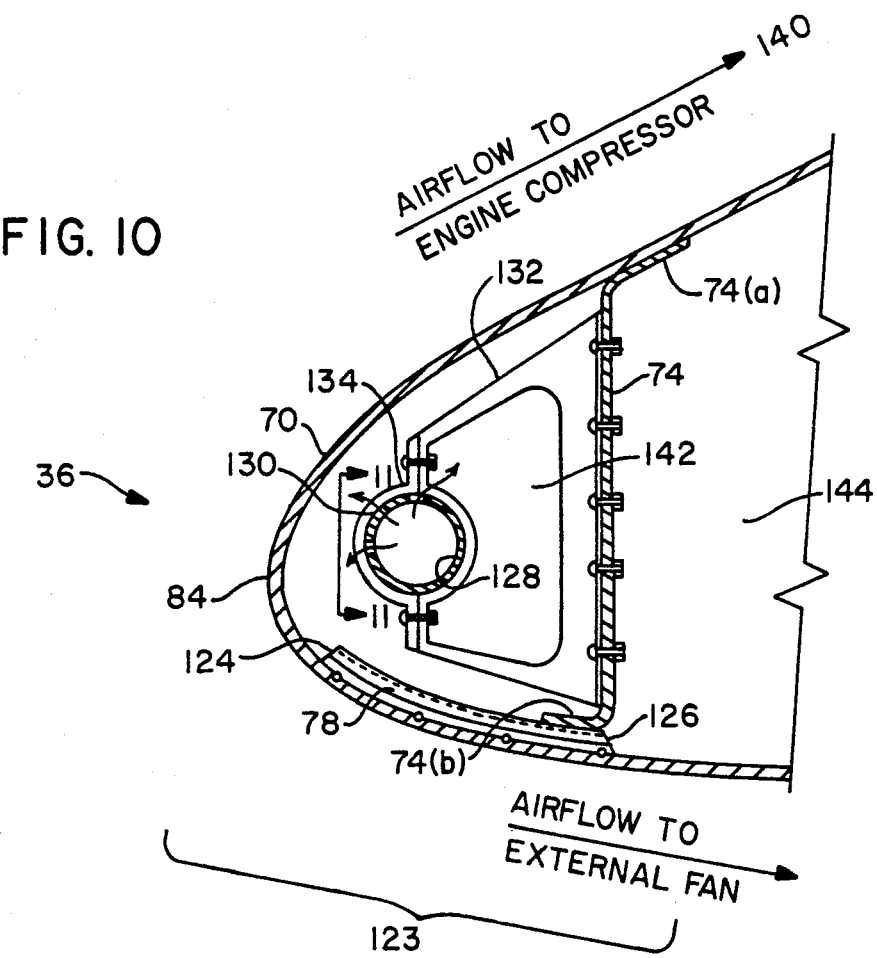
FIG. 10 is a horizontal cross-sectional view of an embodiment of the present invention, taken in a plane radially outward from the center of rotation of an engine and along the line 10—10 of FIG. 7 to show construction of an engine inlet cowling.

Basically, the anti-icing apparatus configuration illustrated in FIGS. 8 and 10 combines the advantages of piccolo or "spray" tubes 128 and inner or "double" skins 72, thereby maximizing heat transfer to those exposed surfaces where ice is most likely to form. The anti-icing system 29(a) illustrated in FIG. 8 is for an engine strut 28. Engine strut 28 is normally configured with a slight positive angle of attack, say in the range of 3°, with respect to the plane of fuselage 22. Therefore, the area in which airborne moisture impinges on the exterior surface of strut 28 in an amount apt to cause significant icing begins up to five inches or more aft of the initial point of contact between the airstream and strut 28 and is thus concentrated on the lower surface of leading edge 29(a). The inner skin 72 is therefore furnished on the lower side of the leading edge 29(a) of strut 28, forming a "double skin" heat exchanger between the lower segments of outer skin 70 and inner skin 72. This configuration assures high heat transfer to that part of outer skin 70 most subject to icing.

Figure 9:
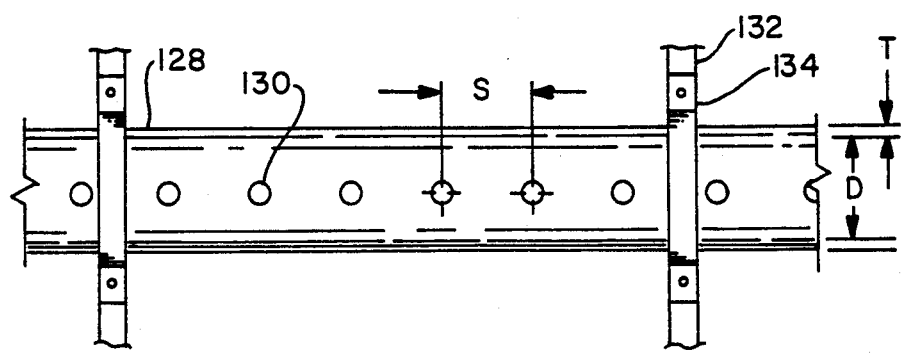
FIG. 9 is a front view of a piccolo tube heating fluid distribution device for de-icing systems of the character disclosed herein, taken along the line 9—9 of FIG. 8.

One exemplary piccolo tube 128 configuration for the anti-icing system 121 of FIG. 8 is shown in FIG. 9. Piccolo tube 128 is provided in a suitable interior diameter "D" and with tube wall thickness "T" to accommodate the required supply pressure and the required mass flow of heating fluid. Heating fluid from any suitable source is supplied to piccolo tube 128, which distributes the heating fluid to locations within the aircraft structure (here, 29(a)) where anti-icing is desired.

Brackets 132 and clamps 134 fix piccolo tube 128 to bulkhead frame 74 at the desired location within leading edge structure 29(a). For both engine strut leading edge structures 29 and engine inlet cowlings 36, a piccolo tube 128 location centered from one inch to three inches rearward of the interior surface 70(a) of outer skin 70 at leading edge 84 will prove satisfactory A single row of heating fluid outlet orifices 130 is provided, and these are oriented directly toward leading edge 84. Spacing "S" of orifices 130 on one and one-half inch centers has been found to provide good heating fluid coverage of leading edge 29(a). However, variations in the number of rows and in the spacing of orifices 130 can be utilized and may indeed provide better performance, depending upon the application of the invention.

During operations at ambient temperatures up to 50° F., at high power settings, and at low airspeeds with visible moisture present, icing of engine components can occur due to inlet temperature depression. For such conditions, engine inlet anti-ice protection by systems which make heat available to the inner throat has long been provided. However, little concern has been given to the anti-icing of the outer surface of the engine inlet cowling. This is because ice which may form on the outer surface of the engine cowling does not present an ice ingestion hazard to conventional engine fan blades.

However, a class of newer jet engines with externally exposed propulsion components, for example the General Electric Company Model 36 unducted fan engines, are at risk of reduced performance or damage due to presence of outer cowling surface runback ice. Exterior engine cowling surfaces must be maintained free of ice to prevent airflow disturbance in order to maintain engine performance. Also, high efficiency, exposed propulsion component engines such as the GE-36 UDF engine are more sensitive to thermal anti-icing bleed air extraction than previous engines.

Figure 11:
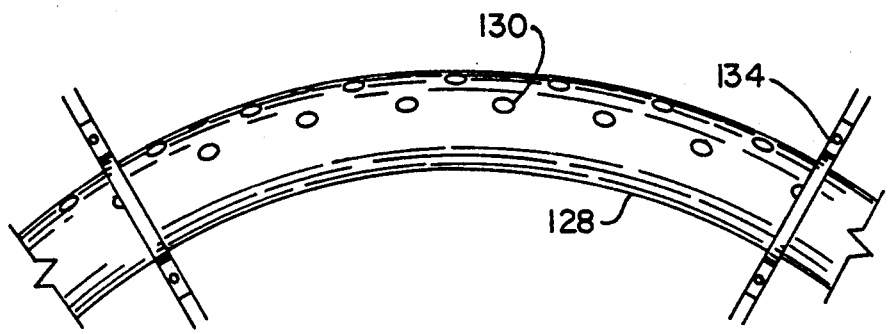
FIG. 11 is a front view of a second type of piccolo tube heating fluid distribution device, taken along the line 11—11 of FIG. 10.

FIG. 10 illustrates an embodiment of our invention which is designed for engine inlet thermal anti-icing service and is particularly suited for engines of the type just described in that a minimum of bleed air is required and the formation of ice on the exterior engine surfaces is inhibited. This system, identified by reference character 123, is in many respects similar to the embodiment shown in FIG. 8. In anti-icing system 123, a circular heating fluid supply tube 128 of the piccolo type with orifices 130 at intervals therealong is installed concentrically in engine cowling 36. It is preferred that orifices 130 be angularly disposed in three staggered or "X"-shaped rows as shown in FIG. 11. Rows of orifices 130 are oriented, respectively, at angles of 15°, 60°, and 110° toward the engine inlet or throat 140 with reference to a normally cylindrical surface of revolution defining the plane cf the leading edge 84.

A double skin heat exchanger with flow passages 78 according to the present invention is provided at engine cowling locations subject to significant icing. Anti-icing fluid is supplied to these passages from piccolo tube 128. Inlet portions 124 of passages 78 may be located approximately one inch rearwardly of leading edge 84. A clearance "X" between the inner surface of outer skin 70 and the outer surface of inner skin 72 providing fluid flow passages 0.1 " may be employed. However, other dimensions may be selected to provide optional performance in other applications of anti-icing system 123.

Also to be noted in FIG. 10 is the construction of upper (inner) and lower (outer) portions 74(a) and 74(b) respectively of frame 74. Here, the lower edge portion 74(b) of frame 74 faces forwardly. This illustrates the important point that, in any of the embodiments of the present invention, it is only required that the edge portions of frame 74 or, for example, those identified by reference characters 92 and 94 in FIG. 3 be interfittingly received in the upper and lower segments of the innermost skin and that the edge portions be seated on the inner skin with their upper and lower faces flush with both the flat inner surfaces of the upper and lower segments of the inner skin and the side-by-side contoured heating passageways. Further, the adhesive or other bonding technique utilized may make it unnecessary for frame 74 to have a flanged edge portion Instead, the frame can simply directly engage the innermost skin segments in a interfittingly snug fashion and seal the forward heating fluid supply plenum 142 from the rearward heating fluid return plenum 144. More conservatively, flanges may be omitted over portions of the span of frame 74, and for example may be utilized only along flat areas and be omitted over passageways 78.

Aircraft leading edge structures with anti-icing systems of the type hereinbefore described may be built by utilizing a manufacturing technique which may be broadly and simply described as roll bonding followed by thermal expansion fabrication. Basically, the roll bonding process consists of chemically cleaning the leading edge inner and outer skin components, printing a debonding agent on one of the skin components at those locations where it is desired to form heating fluid passageways, and cold roll bonding the inner skin and outer skin together to form a metallurgical bond therebetween. Next, the resulting skin workpiece is formed into a desired aircraft leading edge structural shape. Thereafter, the workpiece is heated to a temperature at which the inner skin can plastically deform. During or after heating to the required plastic deformation accommodating temperature depending upon the type of debonding agent used, the workpiece is inserted between a female die and a male die with cavities in the shape of the heating passageways 78 desired in a particular application. While the inner skin is plastic, the spaces between the unbonded areas of the inner and outer skins force are pressurized to free the inner skin into the cavities in the male die. When expansion has been completed, the workpiece is removed from the dies. The workpiece is then cooled, cleaned, and further worked as necessary to achieve a finished aircraft structure.

Figure 12:
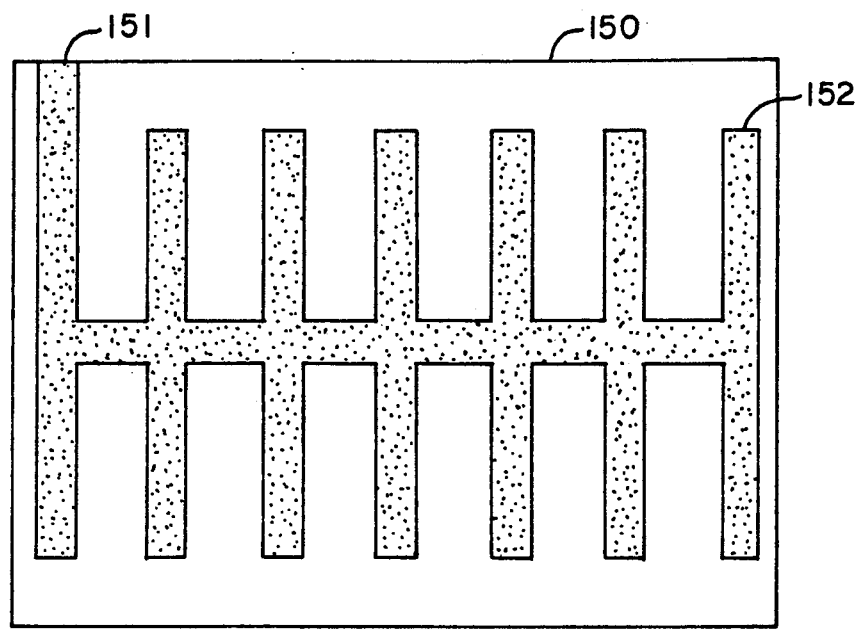
FIG. 12 illustrates a flat sheet metal skin having a debonding agent deposited thereon in a pattern representing the location of desired heating fluid passageways so that the skin can be formed into a de-icing system component in accord with the principles of our invention.

The novel anti-icing system manufacturing technique just described is illustrated in more detail in FIGS. 12-16. FIG. 12 depicts a substantially flat piece of sheet metal 150 which has been smoothed and chemically cleaned to ready it for cold roll bonding. The chemically cleaned and readied sheet metal 150 is coated with a debonding agent 152, typically by a silk screen printing process. The debonding agent is applied in a pattern matching that of the desired heat transfer passageways 78 in the ensuing anti-icing system. A variety of debonding agent mixtures can be used. One is a mixture of graphite and waterglass, another is an ink containing a hydrated metal oxide slurry, such as aluminum hydroxide. The debonding agent may be applied to either the sheet metal part 150 destined to become outer skin 70 of leading edge structure or to a second, similarly prepared, sheet metal part 156 destined to become the inner skin 72 of that structure. When thermal expansion fabrication is done with an externally supplied gas, the debonding agent 152 may extend to edge 151 of sheet 150, for later connection, usually by welding, of a gas-tight fitting to supply the expansion fluid between bonded metal sheets. In any case, once the debonding agent has been applied and dried or cured, the sheet metal part 150 is ready for bonding.

Figure 13:
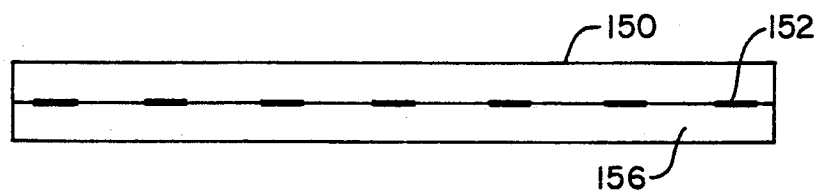
FIG. 13 illustrates inner and outer sheet metal skins which have been placed together prior to bonding in accordance with the method of the present invention.

FIG. 13 illustrates the thus prepared sheet metal parts 150 and 156 in a predetermined relationship with the inner skin forming sheet metal part 156 covering the debonding agent on outer skin forming sheet metal part 150.

After the two skin forming pieces of sheet metal 150 and 156 have been assembled as shown in FIG. 12, they are fed as an assembly through a cold rolling mill to form a metallurgical bond therebetween.

Details of one suitable cold roll bonding process (and appropriate, preliminary, metal smoothing and cleaning steps) are set forth in U.S. Pat. No. 2,690,002, which is hereby incorporated by reference and to which the reader may refer if desired.

Typically, the resulting component 158 (see FIG. 14) is thermally treated to provide stress relief and to produce the desired mechanical properties.

Figure 14:
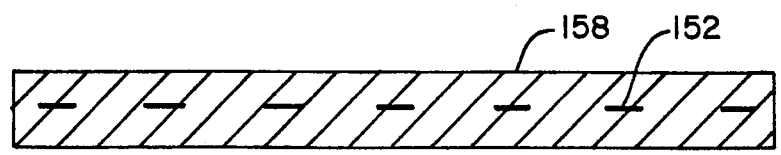
FIG. 14 illustrates inner and outer sheet metal skins which have been cold roll bonded together in accordance with the method of the present invention.

It may also be noted from FIG. 14 that interstitial discontinuities are present in component 158 in those areas where debonding agent was applied to sheet metal part 150.

The dimensions of sheet metal parts 150 and 156, as well as the printing of debonding agent 152 must be carefully selected to achieve the desired final dimensions. In particular, bonding reduces the thickness, varies the width, and increases the length of a workpiece. This thickness reduction and lengthening will depend upon the alloys chosen, the dimension of the components being bonded, the bonding force, etc. Therefore, the above-discussed parameters must be particularized for each particular production operation.

Skin forming workpiece 158 is shaped into an appropriate configuration for the particular leading edge member being fabricated. Any commonly used sheet metal forming technique may be utilized, such as roll forming or die forming. FIGS. 16(a) and 16(b) illustrates one such method in which a female die 160 and male die 162 are utilized to shape workpiece 158. Though not illustrated, it will normally be desirable for a male die 162(a) without cavities to be utilized in an initial forming step for shaping workpiece 158, to avoid dimples in the skin of the finished structure, then for male die 162(b) with passageway forming cavities to be utilized for a subsequent expansion operation to form desired heat transfer passageways. A smooth outer skin surface will result.

After workpiece 158 has been formed to the desired shape, it is heated, as discussed above, until the portion of workpiece 158 which will comprise the inner skin 72 of leading edge structure 64 becomes plastically deformable. Heating of the workpiece may be accomplished by heating the workpiece and dies in a furnace or by heating the die itself. Although some aluminum alloys will attain this condition at less than 400° F., such alloys may not be entirely suitable for thermal anti-icing service as such applications may involve fluid temperatures as high as 430° F., a condition which would be experienced with a locked open heating fluid supply valve, for instance. Therefore, a high temperature service aluminum alloy, such as T-2219-T6, may be selected for thermal anti-icing service. Such alloys may have plastic working temperatures in excess of 600° F. The fluid pressure for expanding what was originally sheet metal part 156 to form the passageways 78 for the heated anti-icing fluid can be achieved with an externally supplied inert gas such as nitrogen, argon, or helium. The requisite fluid pressure can also be developed by employing a thermally decomposable disbonding agent. In either case, the ultimate objective is to expand the inner skin forming metal portion 156 of leading edge structure 64 to form the wanted passageways 78 in workpiece 158.

Thermally decomposable debonding agents, such as hydrated metal oxides which liberate water vapor upon heating, must be formulated so that the ink will not decompose before the workpiece alloy becomes plastic. Otherwise, the bonded sheets could be delaminated or otherwise damaged by the gases liberated as the debonding agent decomposes.

An alternate manufacturing method involves forming workpiece 158 into the desired external shape, heating the workpiece to the desired temperature where inner skin forming components of workpiece 158 become plastically deformable, and expanding passageways without the benefit of dies 160 and 162. However, such "free expansion" technique requires careful formulation of debonding agent 152, or careful pressure control of an externally supplied expansion gas.

When using a thermally decomposable debonding agent, the print pattern of debonding agent 152 should not normally extend to edge 151 of sheet metal part 150, in order to contain in the workpiece 158 the expanding gases liberated from the debonding agent.

Once the expansion of the workpiece and the formation of the desired passageways has been accomplished, the workpiece 158 may be removed from the dies 160 and 162 and then cooled and further processed to achieve the desired structural configuration for the particular application. Such subsequent operations generally include forming or machining the inlet and outlet portions 80 and 82 of heating passageways 78 and in the workpiece and assembling a supply plenum forming frame bulkhead 74 to the leading edge structure developed from workpiece 158. If frame 74 does not include an integral heating fluid supply duct 76, a piccolo tube 128 is attached to it with appropriate brackets as described above.

From the foregoing it can be seen that we have disclosed herein novel, improved anti-icing systems for aircraft leading edge structures and a novel, simple method of fabricating such systems. Our system for heating an aircraft structure having a leading edge so as to inhibit formation of ice thereon also provides resistance to metal fatigue and corrosion. Thus, the device lowers engineering and manufacturing costs, reduces inspection and maintenance requirements, and increases service life while minimizing the danger of metal fatigue or corrosion failures.

The term "chordwise" as employed above in the detailed description of our invention may perhaps be more appropriately designated as "passagewise" as the heating passages of our novel anti-icing systems are not necessarily oriented along a true chord in all aircraft structures in which they are incorporated. This is significant because the present invention is useful for supplying fluid in any desired orientation, whether chordwise, spanwise, or otherwise. Additionally, it is to be understood that the term anti-icing as employed above is to be interpreted to include de-icing.

The foregoing description of representative embodiments of the invention have been presented only for purposes of illustration and description and for providing an understanding of the invention. It is not intended to be exhaustive or to limit the invention to the precise forms disclosed. On the contrary, the intention is to cover all modifications, equivalents and alternatives falling within the spirit and scope of the invention as expressed in the appended claims. It is therefore intended that the scope of the invention be defined by the appended claims rather than by the foregoing description; and all changes which come within the meaning and range of equivalency of the claims are therefore intended to be embraced therein.

What is claimed is:

1. The combination of an aircraft structure having a leading edge and a system for heating said structure to inhibit the formation of ice on said leading edge, said structure having an outer skin with spaced apart, exposed surface defining segments and said heating system including:
   a. an inner skin with a segment of complementary configuration adjacent a segment of said outer skin and cooperating therewith to form a series of flow passages which: are disposed in side-by-side relationship, extend from the leading edge of said structure toward the rear thereof, and have inlets at the leading edge of the structure and outlets to the rear of said inlets;
   b. a bulkhead so extending spanwise of said structure between the inlets and outlets of said flow passages and from one side to the other of said structure as to form a heated fluid inlet plenum that keeps fluid from escaping toward the rear of the structure;
   c. a heated fluid supply manifold: located in said structure on the forward side of said bulkhead, spanning said series of fluid flow passages, and having outlet passages at intervals along the length of the manifold through which the heated fluid can flow into the inlet plenum;
   d. means bonding said outer skin to said inner skin and said manifold to said bulkhead; and
   e. means for effecting a flow of a heated fluid: into said supply manifold, from said manifold toward the leading edge of said structure, through said inlets into said flow passages, through said passages, and from said outlets to thereby affect a transfer of thermal energy from said fluid to the outer skin of said structure to heat said skin and thereby inhibit the formation of ice on that skin.

2. A combination as defined in claim 1, wherein the outlet passages from said heated fluid supply manifold are arranged in sets and wherein, in each set, there are a first outlet passage for directing the heated fluid from said manifold toward one of the segments of the outer skin of the structure and a second outlet passage for directing said fluid from said manifold toward the other of the segments of said skin.

3. A combination as defined in claim 1, wherein said bulkhead has one integral edge portion extending along and engaging a segment of said outer skin on one side of said structure and a second integral edge portion extending along, and engaging, a segment of said inner skin on the other side of said structure, said second edge portion being configured to match that segment of the inner skin on said other side of said structure.

4. A combination as defined in claim 1 wherein the heating system includes means for collecting and dumping overboard the fluid discharged from said flow passages through said outlets, said last-mentioned means comprising:
   a. a second bulkhead extending spanwise within said structure and from one to the other of the segments of the outer skin, said bulkhead having edge portions meeting the segments of said outer skin, and thereby cooperating with said outer skin to define an exhaust plenum for the heated fluid;
   b. a fluid exhaust duct having an inlet portion and an outlet portion, said inlet portion communicating with said exhaust plenum and said outlet portion communicating with the ambient surroundings, whereby fluid discharged from said fluid passageways and collected in said exhaust plenum may be dumped overboard.

5. A combination as defined in claim 1, wherein the outlet passages from said heated fluid supply manifold are arranged in sets and wherein, in each set, there are:
   a. a first outlet passage for directing the heated fluid from said manifold toward one of the segments of the outer skin of the structure so that the heated fluid impinges upon the internal portion of said outer skin adjacent said outlet,
   b. a second outlet passage for directing said fluid from said manifold toward the same segment of said skin, so that the heated fluid impinges upon the internal portion of said outer skin adjacent said second outlet, and a third outlet passage for directing said fluid from said manifold toward the same segment of said skin, so that the heated fluid impinges upon the internal portion of said outer skin adjacent to said third outlet.

6. A combination as defined in claim 1, wherein said heating fluid supply manifold is metallurgically bonded to the upstream side of said bulkhead.

7. A combination as defined in claim 1, wherein said leading edge structure is displaceably supported from a separate aircraft component.

8. A combination as defined in claim 1, wherein said leading edge structure is a wing, an engine supporting strut, an engine cowling, or a horizontal or vertical stabilizer.

9. A combination as defined in claim 1, wherein the flow passages of the heating system extend from the leading edge of the leading edge structure toward the trailing edge thereof.

10. A combination as defined in claim 1 which also includes:
    a. a heated fluid supply line in and extending spanwise of said structure; and
    b. means providing fluid communication between said fluid supply line and said manifold.

11. A combination as defined in claim 10 in which said heated fluid supply line is located in said manifold.

12. A combination as defined in claim 10 in which the heated fluid supply line is located on the opposite side of said bulkhead from said manifold.

* * * * *